United States Patent
Fujita et al.

(10) Patent No.: US 7,767,047 B2
(45) Date of Patent: Aug. 3, 2010

(54) METHOD FOR PRODUCING MULTILAYER LAMINATED FILM

(75) Inventors: Yutaka Fujita, Ibaraki (JP); Kazuki Tsuchimoto, Ibaraki (JP); Morimasa Wada, Ibaraki (JP); Tomoyuki Senoo, Ibaraki (JP); Takafumi Ooura, Ibaraki (JP); Kentarou Ikeshima, Ibaraki (JP); Tomoaki Masuda, Ibaraki (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 365 days.

(21) Appl. No.: 11/826,112

(22) Filed: Jul. 12, 2007

(65) Prior Publication Data

US 2008/0011411 A1 Jan. 17, 2008

(30) Foreign Application Priority Data

Jul. 12, 2006 (JP) ............................. 2006-191765
Apr. 25, 2007 (JP) ............................. 2007-115605

(51) Int. Cl.
*B29C 65/52* (2006.01)

(52) U.S. Cl. ................. 156/182; 156/324; 156/555; 156/312; 156/87; 156/582

(58) Field of Classification Search .................. 156/324
See application file for complete search history.

(56) References Cited

U.S. PATENT DOCUMENTS

2006/0078754 A1* 4/2006 Murakami et al. ........... 428/532
2006/0194004 A1* 8/2006 Niemoller et al. ......... 428/32.11
2006/0291054 A1* 12/2006 Tomoguchi ................. 359/485

FOREIGN PATENT DOCUMENTS

JP 10-166519 A 6/1998
JP 10166519 A * 6/1998
WO WO 2005033754 A1 * 4/2005

OTHER PUBLICATIONS

Saint-Gobain Technical Fabrics. "Lamination." 2008. pp. 1-2.*

* cited by examiner

*Primary Examiner*—Joseph S Del Sole
*Assistant Examiner*—Vicki Wu
(74) *Attorney, Agent, or Firm*—Westerman, Hattori, Daniels & Adrian, LLP

(57) ABSTRACT

A method for producing a multilayer laminated film comprising: laminating a resin film having a moisture percentage of 10% by weight to 60% by weight with a first transparent film and a second transparent film each having a moisture percentage of 0.5% by weight to 5% by weight to be bonded to both sides of the resin film through an adhesive or pressure-sensitive adhesive layer interposed therebetween; wherein the laminating comprising steps of: passing the resin film and the first transparent film between a pair of a first metal roll and a first elastic roll in such a manner that the first transparent film is placed on the first metal roll side so that they are bonded to each other under pressure to form a laminated film; and then, using the laminated film without winding up it and passing the laminated film and the second transparent film between a pair of a second metal roll and a second elastic roll in such a manner that the second transparent film is placed on the second metal roll side so that they are bonded to each other under pressure to form a multilayer laminated film. The method can prevent bubbles from being formed between the resin film and the transparent film.

4 Claims, 4 Drawing Sheets

[FIG.1]
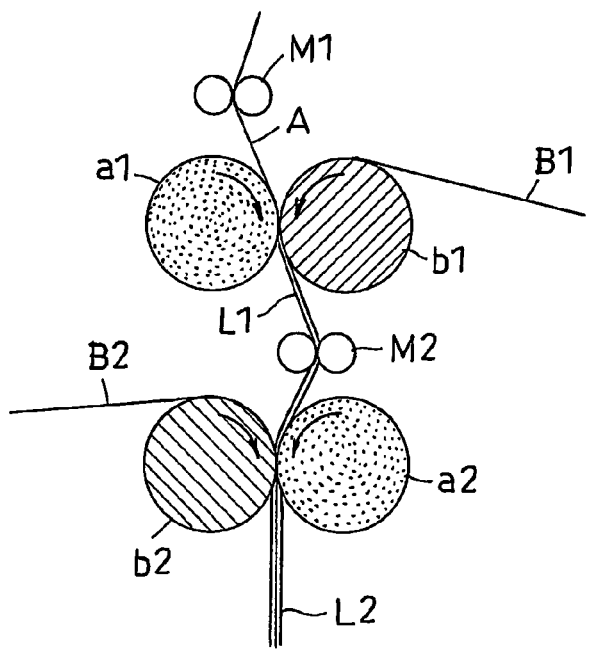
[FIG.2A]
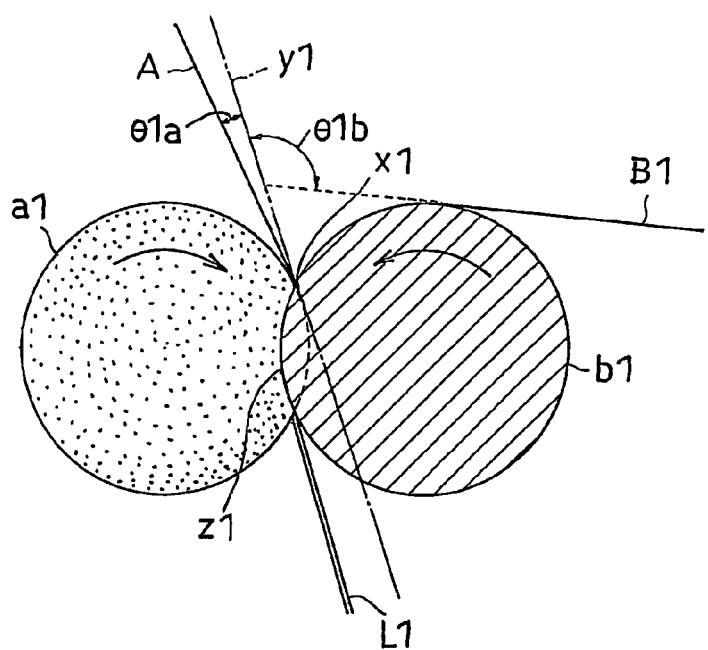

[FIG.2B]
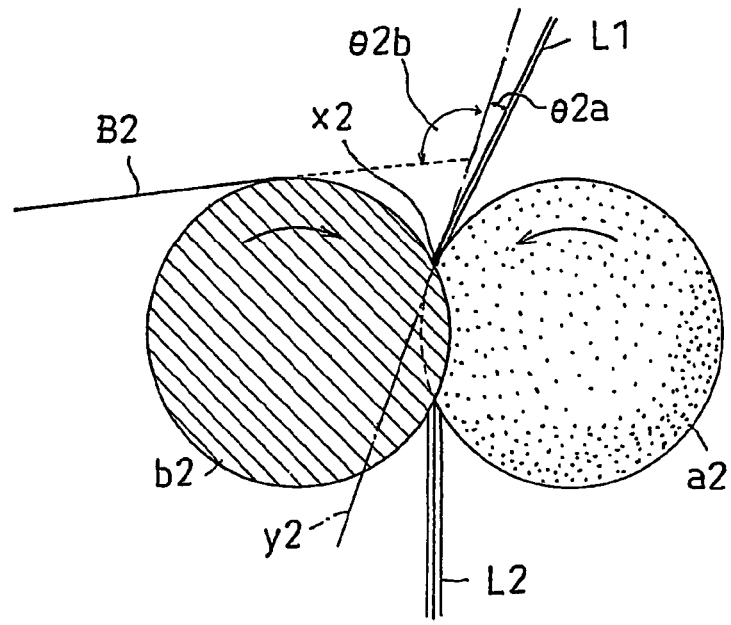
[FIG.3]
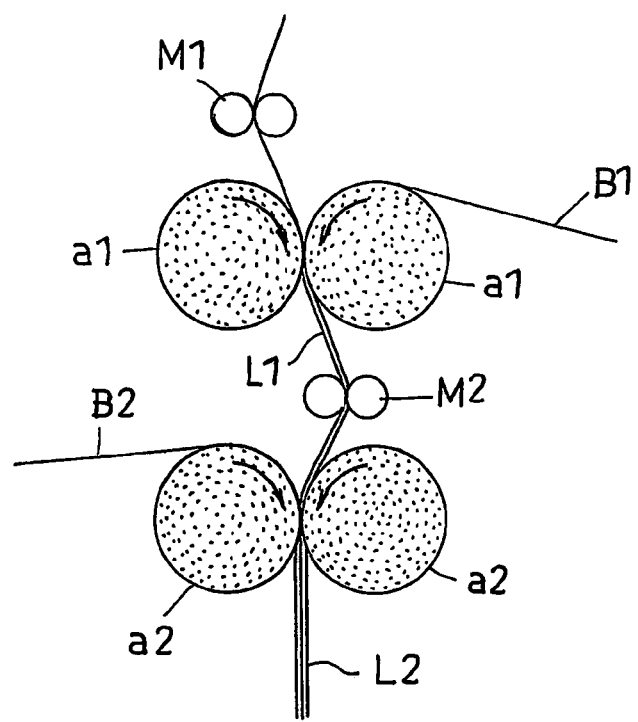

[FIG.4]
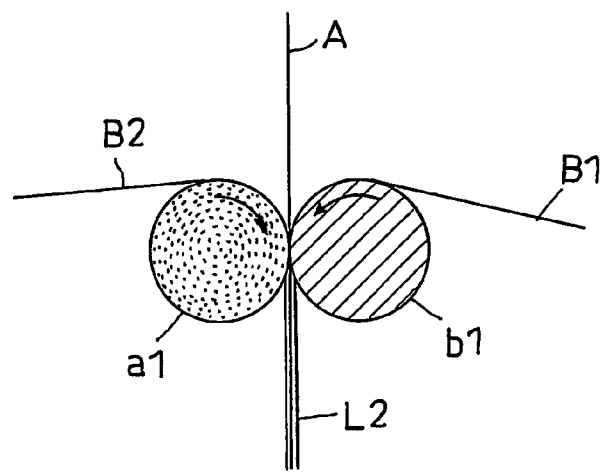
[FIG.5]
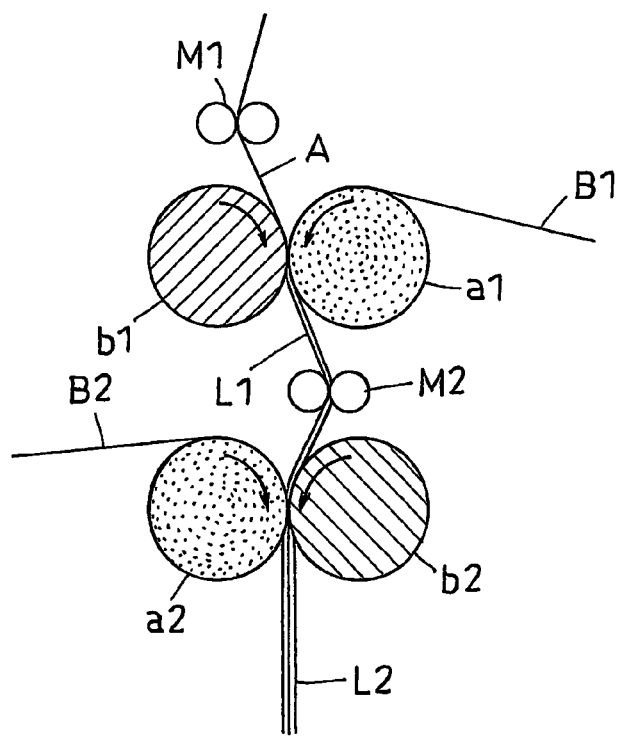

[FIG.6]
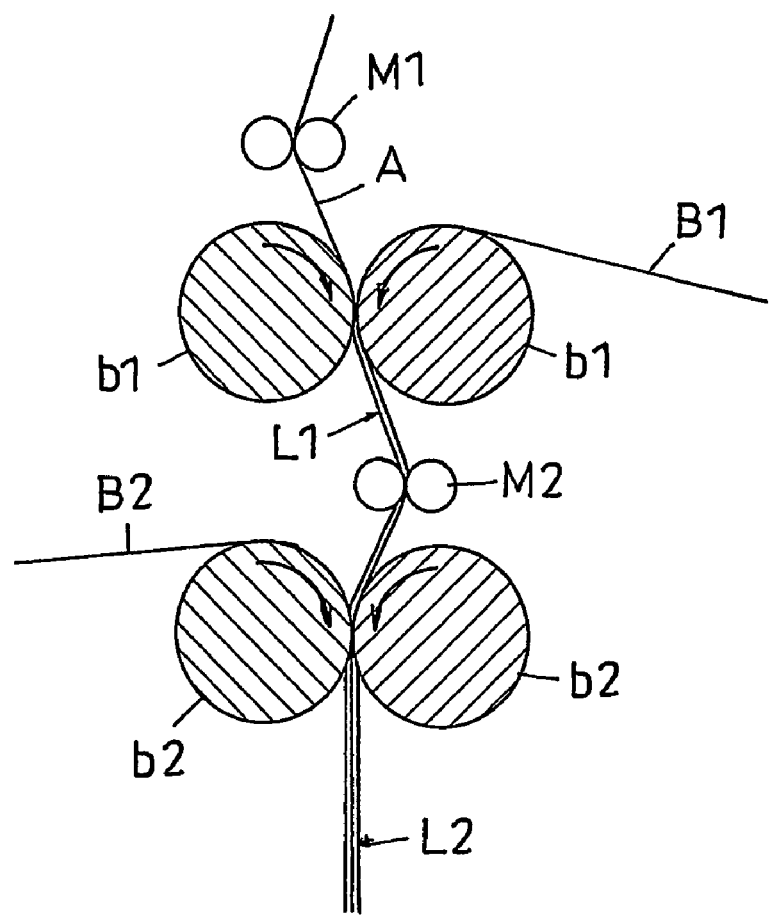

METHOD FOR PRODUCING MULTILAYER LAMINATED FILM

BACKGROUND OF THE INVENTION

1. Field of the Invention

The present invention relates to a method for producing a multilayer laminated film, which comprises bonding first and second transparent films each having a moisture percentage of 0.5 to 5% by weight to both sides of a resin film having a moisture percentage of 10 to 60% by weight through an adhesive or pressure-sensitive adhesive layer interposed therebetween.

The production method of the present invention may be used to form a variety of multilayer laminated films. Specifically, the production method of the present invention may be used to form a polarizing plate, in which a polarizing film is used as the resin film, and transparent protective films for the polarizing film are used as the transparent films. The production method of the present invention may also be used to form other multilayer laminated films for use in wrapping food products, medical equipment and so on.

2. Description of the Related Art

A conventional process of bonding a transparent film to both sides of a resin film to form a multilayer laminated film generally has been used aqueous adhesives or pressure-sensitive adhesives. The method for bonding the transparent film to both sides of the resin film typically employs a simultaneous lamination method that includes feeding the resin film between a pair of rolls while feeding the transparent film to both sides thereof, and laminating them at the same time or employs a sequential lamination method that includes feeding the resin film between a pair of rolls while feeding the transparent film to one side thereof, laminating them, and then bonding the transparent film to the other side of the resin film.

If the resin film and the transparent film are laminated according to the above lamination method, however, bubbles can be formed between the resin film and the transparent film in the resulting multilayer laminated film. In addition, wrinkles or stripe-like irregularities can also be produced.

Concerning the problem of the production of wrinkles and so on, there is proposed a method including laminating a resin film (a polyvinyl alcohol film with a moisture percentage of 0.1 to 20% by weight) and a transparent film (a cellulose film) under a specific nip pressure (JP-A No. 10-166519). Even using this method, however, the production of bubbles cannot be sufficiently prevented between the resin film and the transparent film in the multilayer laminated film.

SUMMARY OF THE INVENTION

It is an object of the present invention to provide a multilayer laminated film production method that includes bonding a transparent film to a resin film and can prevent bubbles from being formed between the resin film and the transparent film and can also prevent the production of wrinkles or stripe-like irregularities.

As a result of investigations for solving the above problems, the inventors have found that the object can be achieved by the multilayer laminated film production method described below so that the present invention has been completed.

The present invention relates to a method for producing a multilayer laminated film comprising:

laminating a resin film having a moisture percentage of 10% by weight to 60% by weight with a first transparent film and a second transparent film each having a moisture percentage of 0.5% by weight to 5% by weight to be bonded to both sides of the resin film through an adhesive or pressure-sensitive adhesive layer interposed therebetween; wherein the laminating comprising steps of:

passing the resin film and the first transparent film between a pair of a first metal roll and a first elastic roll in such a manner that the first transparent film is placed on the first metal roll side so that they are bonded to each other under pressure to form a laminated film; and then, using the laminated film without winding up it and passing the laminated film and the second transparent film between a pair of a second metal roll and a second elastic roll in such a manner that the second transparent film is placed on the second metal roll side so that they are bonded to each other under pressure to form a multilayer laminated film.

In the method for producing the multilayer laminated film, at least one of the first metal roll and the second metal roll is preferably an iron roll or a stainless steel roll.

In the method for producing the multilayer laminated film, the first elastic roll and the second elastic roll each preferably comprise a metallic core coated with a rubber layer or a resin layer. The rubber or resin layer of each of the first elastic roll and the second elastic roll preferably has a hardness of 70 to 100.

In the method for producing the multilayer laminated film, an angle ($\theta 1a$) made by a line of feeding of the resin film with a tangent line at an endpoint of an inwardly deformed portion of the first elastic roll and an angle ($\theta 1b$) made by a line of feeding of the first transparent film with the tangent line at the endpoint of the inwardly deformed portion of the first elastic roll are preferably opposite in direction to each other with respect to the tangent line at the endpoint of the inwardly deformed portion of the first elastic roll.

The endpoint of the inwardly deformed portion of the first elastic roll corresponds to the first contact point between the first elastic roll and the first metal roll in the inwardly deformed portion of the first elastic roll, which is formed when the first elastic roll is brought into contact with and pressed against the first metal roll, the line of feeding of the resin film corresponds to a tangent line at the first contact point between the resin film and the first elastic roll, and the line of feeding of the first transparent film corresponds to a tangent line at the first contact point between the first transparent film and the first metal roll.

In the method for producing the multilayer laminated film, the method may further comprise using means that changes the angle ($\theta 1a$) made by the line of feeding of the resin film with the tangent line at the endpoint of the inwardly deformed portion of the first elastic roll before the resin film is fed between the pair of the first metal roll and the first elastic roll.

In the method for producing the multilayer laminated film, an angle ($\theta 2a$) made by a line of feeding of the laminated film with a tangent line at an endpoint of an inwardly deformed portion of the second elastic roll and an angle ($\theta 2b$) made by a line of feeding of the second transparent film with the tangent line at the endpoint of the inwardly deformed portion of the second elastic roll are preferably opposite in direction to each other with respect to the tangent line at the endpoint of the inwardly deformed portion of the second elastic roll.

The endpoint of the inwardly deformed portion of the second elastic roll corresponds to the first contact point between the second elastic roll and the second metal roll in the inwardly deformed portion of the second elastic roll, which is formed when the second elastic roll is brought into contact with and pressed against the second metal roll, the line of feeding of the laminated film corresponds to a tangent line at the first contact point between the laminated film and the second elastic roll, and the line of feeding of the second transparent film corresponds to a tangent line at the first contact point between the second transparent film and the second metal roll.

In the method for producing the multilayer laminated film, the method may further comprise using means that changes the angle (θ2a) made by the line of feeding of the laminated film with the tangent line at the endpoint of the inwardly deformed portion of the second elastic roll before the laminated film is fed between the pair of the second metal roll and the second elastic roll.

In the method for producing the multilayer laminated film, at least one of a lamination pressure between the first metal roll and the first elastic roll and a lamination pressure between the second metal roll and the second elastic roll is preferably from 2 MPa to 5 MPa.

The multilayer laminated film production method according to the present invention applies a sequential lamination process and uses a pair of an elastic roll and a metal roll to laminate the films to each other. In addition, both the process of laminating a resin film and a transparent film and the process of laminating another transparent film and the resin film side of a laminated film comprising the resin film and the transparent film bonded to each other each include passing the films in such a manner that the transparent film is placed on the metal roll side. Such a combination of rolls blocks the water-containing resin film from coming into contact with the metal roll and allows the lamination of the resin film and the transparent film by the elastic force of the elastic roll so that bubbles can be prevented from being formed between the resin film and the transparent film, and thus a multilayer laminated film can be successfully produced. In addition, the production of wrinkles or stripe-like irregularities can also be prevented.

In the multilayer laminated film production method of the present invention, the angle of feeding of each film may be controlled in such a manner that the angle (θ1a) of feeding of the resin film and the angle (θ1b) of feeding of the first transparent film can be opposite in direction to each other with respect to the tangent line at the endpoint of the inwardly deformed portion of the first elastic roll and/or in such a manner that the angle (θ2a) of feeding of the laminated film and the angle (θ2b) of feeding of the second transparent film can be opposite in direction to each other with respect to the tangent line at the endpoint of the inwardly deformed portion of the second elastic roll. In this case, the period from the time of the first contact between the resin film and the first transparent film or between the laminated film and the second transparent film to the time when the films are press-bonded to each other by the rolls can be controlled to be relatively short so that bubble can be further prevented from being formed between the resin film and the transparent film.

If a polarizing film is used as the resin film and if a transparent protective film for the polarizing film is used as the transparent film, the multilayer laminated film production method will be suitable for the production of a polarizing plate, and the resulting polarizing plate can be free of the formation of bubbles between the films and free of the production of wrinkles or stripe-like irregularities and thus can have a good appearance. Such a polarizing plate can have high in-plane uniformity and high resolution and can form a high contrast image display such as a high contrast liquid crystal displays (LCD) and a high contrast electroluminescence display (ELD).

BRIEF DESCRIPTION OF THE DRAWINGS

FIG. 1 is a schematic diagram showing a multilayer laminated film production method according to the present invention;

FIG. 2A is a schematic diagram showing the relationships between the angles at which films enter between rolls in the multilayer laminated film production method according to the present invention;

FIG. 2B is a schematic diagram showing the relationships between the angles at which films enter between rolls in the multilayer laminated film production method according to the present invention;

FIG. 3 is a schematic diagram showing a multilayer laminated film production method according to a comparative example;

FIG. 4 is a schematic diagram showing a multilayer laminated film production method according to a comparative example;

FIG. 5 is a schematic diagram showing a multilayer laminated film production method according to a comparative example;

FIG. 6 is a schematic diagram showing a multilayer laminated film production method according to a comparative example.

DETAILED DESCRIPTION OF THE PREFERRED EMBODIMENTS

The method for producing a multilayer laminated film according to the present invention is described below with reference to the drawings. FIG. 1 shows an example of the multilayer laminated film production method of the present invention, in which a resin film A and a first transparent film B1 are first passed between a pair of a first elastic roll a1 and a first metal roll b1 so that they are bonded under pressure to form a laminated film L1. At the pair of rolls, the resin film A is placed on the first elastic roll a1 side, while the first transparent film B1 is placed on the first metal roll b1 side. Next, the laminated film L1 is used without being wound up, and the laminated film L1 (the resin film A side) and a second transparent film B2 are passed between a pair of a second metal roll b2 and a second elastic roll a2 so that they are bonded under pressure to form a multilayer laminated film L2. The multilayer laminated film L2 includes the resin film A and the first and second transparent films B1 and B2 placed on both sides of the resin film A. At the pair of rolls, the laminated film L1 is placed on the second elastic roll a2 side, while the second transparent film B2 is placed on the second metal roll b2 side.

In FIG. 1, angle changing means M1 is provided for changing the angle of the resin film A before the film A is fed between the pair of the first elastic roll a1 and the first metal roll b1. Angle changing means M2 is also provided for changing the angle of the laminated film L1 before the laminated film L1 is fed between the pair of the second elastic roll a2 and the second metal roll b2. By means of the angle changing means M1, the angle of the resin film A entering between the first elastic roll a1 and the first metal roll b1 can be controlled. And by means of the angle changing means M2, the angle of the laminated film L1 entering between the second elastic roll a2 and the second metal roll b2 can be controlled. FIG. 1 shows that the angle changing means M1 and M2 each include a pair of rolls, which are shifted to the left or the right in the drawing so that the entering angle can be controlled.

Between the pair of the first elastic roll a1 and the first metal roll b1, the resin film A is bonded to the first transparent film B1 through an adhesive layer or a pressure-sensitive adhesive layer (not shown) interposed therebetween. The adhesive layer or the pressure-sensitive adhesive layer may be formed on at least one of the resin film A and the first transparent film B1. Alternatively, an adhesive (solution) or pressure-sensitive adhesive (solution) with a controlled concentration or viscosity may be applied immediately before the resin film A is bonded to the first transparent film B1, and they may be passed together through the adhesive or pressure-sensitive adhesive between the pair of the first elastic roll a1 and the first metal roll b1 so that they can be bonded under pressure. Similarly, between the pair of the second elastic roll a2 and the second metal roll b2, the laminated film L1 is bonded to the second transparent film B2 through an adhesive layer or a pressure-sensitive adhesive layer (not shown) interposed therebetween. The adhesive layer or the pressure-sensitive adhesive layer may be formed on the second transparent film B2. Alternatively, an adhesive (solution) or pressure-sensitive adhesive (solution) with a controlled concentration or viscosity may be applied immediately before the laminated film L1 is bonded to the second transparent film B2, and they may be passed together through the adhesive or pressure-sensitive adhesive between the pair of the second elastic roll a2 and the second metal roll b2 so that they can be bonded under pressure.

The roll material, the roll diameter, the feed speed at the time of the lamination, and so on may be adjusted as appropriate. The thickness of the adhesive or pressure-sensitive adhesive layer may also be adjusted as appropriate.

For example, as the first elastic roll a1 and the second elastic roll a2; elastic rolls each comprising a metallic core coated with a rubber layer or a resin layer may be preferably used. The rubber layer or the resin layer to be used preferably has a hardness of 70 or more, more preferably of 80 or more, still more preferably of 85 or more. In order to prevent the film surface from being scratched, the hardness is preferably 100 or less, more preferably 95 or less. For example, the hardness may be measured with a commercially available durometer (type A) by the method according to JIS K 6253 (1997). The thickness of the rubber layer or the resin layer is preferably from about 1 to about 15 mm, more preferably from about 3 to about 10 mm, in view of uniformity of contact pressure distribution. The first elastic roll and the second elastic roll a1 and a2 may be the same or different.

For example, the material for the first metal roll and the second metal roll b1 and b2 include iron, stainless steel, titanium, aluminum, or the like. The metal roll is preferably an iron roll or a stainless steel roll, in view of cost effectiveness and corrosion resistance. The first metal roll b1 and the second metal roll b2 may be the same or different.

If the diameter of each roll is reduced, the contact area between the resin film A and the first transparent film B1 or the second transparent film B2 will be reduced so that the pressure applied to the film surface will be relatively high. Therefore, the diameter of the roll to be used is preferably 250 mm or less, more preferably 200 mm or less. If the diameter is too small, the roll can have low durability so that sufficient force cannot be applied. Accordingly, the roll to be used is preferably 50 mm or more, more preferably 100 mm or more in diameter.

In general, but are not limited to, the feed speed in the lamination process is preferably controlled to be from about 2 m/minute to about 50 m/minute In the lamination process, the lamination pressure between the rolls may be appropriately set without limitation. In view of easiness of control and in view of the productivity of the multilayer laminated film, the lamination pressure is preferably from about 2 MPa to about 5 MPa, more preferably from 3 MPa to 4 MPa. If the lamination pressure is less than 2 MPa, pressing can be insufficient so that bubbles can be formed between the films. If the lamination pressure is more than 5 MPa, the rolls or the system can be overloaded, which can be a cause of breakage. The lamination pressure may be determined by a measurement process including using a pressure sensitive paper sheet (Prescale manufactured by Fujifilm Corporation), binarizing the change in the color of the pressure sensitive paper sheet by computer image processing, and determining the lamination pressure from an approximate expression of a pressure standard line produced with respect to the coloring area and concentration.

As shown in FIG. 2A, the multilayer laminated film production method preferably includes controlling the angle ($\theta 1a$) of feeding of the resin film A and the angle ($\theta 1b$) of feeding of the first transparent film B1 in such a manner that they are opposite in direction to each other with respect to a tangent line y1 at an endpoint x1 of an inwardly deformed portion of the first elastic roll a1. Namely, the angle ($\theta 1a$) made by the line of feeding of the resin film A with the tangent line y1 at the endpoint x1 of the inwardly deformed portion of the first elastic roll a1 and the angle ($\theta b1$) made by the line of feeding of the first transparent film B1 with the tangent line y1 are preferably controlled to be opposite in direction to each other with respect to the tangent line y1. This control can reduce the period between the time of the first contact between the resin film A and the first transparent film B1 and the time when these films are press-bonded by the first elastic roll a1 and the first metal roll b1, so that bubbles can be further prevented from being formed between the resin film A and the first transparent film B1. The angle ($\theta 1a$) can be controlled by the angle changing means M1 shown in FIG. 1.

In FIG. 2A, the endpoint x1 of the inwardly deformed portion of the first elastic roll a1 corresponds to the first contact point (the point of the first contact in the rotation direction) between the first elastic roll a1 and the first metal roll b1 in the inwardly deformed portion z1 of the first elastic roll a1, which is formed when the first elastic roll a1 is brought into contact with and pressed against the first metal roll b1. The line of feeding of the resin film A corresponds to a tangent line (along the extended line from the resin film A being fed) at the first contact point between the resin film A and the first elastic roll a1. The line of feeding of the first transparent film B1 corresponds to a tangent line (along the extended line from the first transparent film B1 being fed) at the first contact point between the first transparent film B1 and the first metal roll b1.

In FIG. 2A, the counterclockwise angle ($\theta 1a$) from the tangent line y1 may be designated as "−" (negative), while the clockwise angle ($01b$) from the tangent line y1 may be designated as "+" (positive). The angle ($\theta 1a$) may be any value, as long as it is "−" (negative). The angle ($01b$) may also be any value, as long as it is "+" (positive).

While the angles $\theta 1a$ and $\theta 1b$ of feeding of the resin film A and the first transparent film B1 are described above with reference to FIG. 2A, the angle ($\theta 2a$) of feeding of the laminated film L1 and the angle ($\theta 2b$) of feeding of the second transparent film B2 may also be controlled similarly as shown in FIG. 2B, so that bubbles can be further prevented from being formed between the resin film A of the laminated film L1 and the second transparent film B2. The angle ($\theta 2a$) can be controlled by the angle changing means M2 shown in FIG. 1.

In FIG. 2B, the clockwise angle (θ2a) from the tangent line y2 may be designated as "+" (positive), while the counterclockwise angle (θ2b) from the tangent line y2 may be designated as "−" (negative). The angle (θ2a) may be any value, as long as it is "+" (positive). The angle (θ2b) may also be any value, as long as it is "−" (negative).

The resin film for use in the multilayer laminated film production method of the present invention has a moisture percentage of 10 to 60% by weight. The resin film for use in the present invention preferably has a moisture percentage of 15 to 50% by weight, more preferably of 20 to 40% by weight. On the other hand, the first and second transparent films each have a moisture percentage of 0.5 to 5% by weight. The transparent films for use in the present invention preferably have a moisture percentage of 1 to 3% by weight. The first and second transparent films may be of the same material or different materials and may have the same moisture percentage or different moisture percentages. In the multilayer laminated film production method, the material for forming the adhesive or pressure-sensitive adhesive layer may be determined as appropriate depending on the resin film and the transparent film to be used.

A description is given below of a case where a polarizing plate is produced by laminating a polarizing film (used as the resin film) and transparent protective films (used as the transparent films) for the polarizing film through an adhesive or pressure-sensitive adhesive layer interposed therebetween.

In general, a product produced by dyeing a polymer film such as a polyvinyl alcohol (PVA) film with a dichroic material such as iodine and a dichroic dye and uniaxially stretching it may be used as the polarizing film. The thickness of such a polarizing film to be used may be, but not limited to, from about 5 to about 80 μm, preferably from 40 μm or less.

Concerning the optical properties of the polarizing film, a single piece of the polarizing film preferably has a measured single transmittance of 40% or more, preferably in the range of 42 to 45%. When two pieces of the polarizing films are provided and laminated such that their absorption axes are at 90° to each other, the measured perpendicular transmittance of the laminate is preferably as small as possible, and practically, it is preferably from 0.00% to 0.050%, more preferably 0.030% or less. Practically, its degree of polarization is preferably from 99.90% to 100%, particularly, it is preferably from 99.93% to 100%. It is preferred that the measurement of the polarizing plate should provide optical properties almost equal to the above.

Any of various polymer films may be used without limitation to from the polarizing film. Examples of such films include hydrophilic polymer films such as polyvinyl alcohol (PVA) films, polyethylene terephthalate (PET) films, ethylene-vinyl acetate copolymer films, partially saponified films thereof, cellulose films, and oriented polyene films such as dehydrated products of PVA and dehydrochlorinated products of polyvinyl chloride. In particular, PVA films are preferably used, because they have good dyeability with a dichroic material such as iodine.

The polymer for use as the material for the polymer film generally has a degree of polarization of 500 to 10,000, preferably of 1,000 to 6,000, more preferably of 1,400 to 4,000. When a saponified polymer is used, its degree of saponification is preferably from 75% by mole or more, more preferably 98% by mole or more, still more preferably from 98.3 to 99.8% by mole, for example, in view of solubility in water.

When a PVA film is used as the polymer film, a product prepared by any PVA film forming method such as a flow casting method in which an aqueous or organic solvent solution of raw materials is cast to form a film, a casting method, and an extrusion method may be appropriately used. In this case, the film to be used preferably has a retardation of 5 nm to 100 nm. In order to form a polarizing film with in-plane uniformity, variations in the in-plane retardation of the PVA film is preferably as small as possible and preferably 10 nm or less, more preferably 5 nm or less, at a measurement wavelength of 1000 nm.

In the process of laminating the polarizing film and the transparent protective film, the polarizing film may have any moisture percentage in the range of 10 to 60% by weight. If the moisture percentage is too low, stripe-like irregularities or bubbles can tend to be formed in the resulting polarizing plate. If the moisture percentage is too high, drying for a long time can be required so that a too large drying system can be required. From these points of view, the moisture percentage of the polarizing film is preferably from 15 to 50% by weight, more preferably from 20 to 40% by weight, in the process of laminating the transparent protective film on the polarizing film. In general, the moisture percentage of the polarizing film may be controlled by the drying conditions in the process of manufacturing the polarizing film. If necessary, however, a moisture control process may be independently performed in which immersion in a water bath or spray of water droplets may be performed, or drying may be performed again by heating or under reduced pressure.

General methods for producing the polarizing film may fall roughly into, but are not limited to, a dry stretching method and a wet stretching method. While the steps for manufacturing the polarizing film by wet stretching may use any appropriate method depending on the conditions, for example, a method of producing it by a series of manufacturing steps including swelling, dyeing, crosslinking, stretching, water-washing, and drying the polymer film is generally used. Except for the drying step, each step may be performed while the film is immersed in a bath including various kinds of solutions. Concerning the steps of swelling, dyeing, crosslinking, stretching, washing with water, and drying, there is no particular limitation on the order of the steps, the number of times of each step, or the presence or absence of each step, and some steps may be simultaneously performed in a single process, or some steps may be omitted. For example, the stretching may be performed after the dyeing or simultaneously with the swelling or the dyeing or may be followed by the dyeing. A method in which the crosslinking is performed before or after the stretching may also preferably be used. Any appropriate technique may be used for the stretching. In the case of roll stretching, for example, a method in which stretching is achieved through a difference between the peripheral speeds of rolls may be used. In each process, an additive such as boric acid, borax or potassium iodide may be added as needed. Thus, if necessary, the polarizing film may contain boric acid, zinc sulfate, zinc chloride, potassium iodide, or the like. In some of these processes, stretching may be performed in the flow direction or in the width direction, as needed, and the process of washing with water may be performed at every process.

For example, the swelling step includes immersing the polymer film in a treatment bath (a swelling bath) filled with water. In this step, the polymer film is washed with water so that the surface of the polymer film can be cleaned of dirt or an anti-blocking agent, and the polymer film is allowed to swell so that it can be expected that the non-uniform state of the film such as uneven dyeing will be effectively prevented. Glycerin, potassium iodide or the like may be added to the swelling bath as needed. Concerning the concentration of the additive, glycerin is preferably added at a concentration of 5% by weight or less, and potassium iodide is preferably added at a concentration of 10% by weight or less. The temperature of the swelling bath may be from about 20 to about 50° C. The time period of immersion in the swelling bath may be from about 2 to about 180 seconds. The polymer film may also be stretched in the swelling bath, and in such a process, the stretch ratio may be from about 1.1 to about 3.5.

For example, the dyeing step may include a method of dyeing the polymer film by immersing it in a treatment bath (a dyebath) containing a dichroic material such as iodine. Any known conventional dichroic material such as iodine and organic dyes may be used. Examples of the organic dyes include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black. One or more of these dichroic materials may be used alone or in any combination. Particularly in the present invention, iodine is preferably used, because it has good optical properties such as high polarization degree and can easily produce a stripe-like irregularities-reducing effect according to the present invention.

A solution of the dichroic material in a solvent may be used for the dyebath. While water such as pure water is generally used as the solvent, an organic solvent compatible with water may further be added. The concentration of the dichroic material is from about 0.010 to about 10% by weight. The time period of the immersion of the polymer film in the dyebath may be, but not limited to, about 0.5 to about 20 minutes, and the dyebath temperature may be from about 5 to about 42° C. The polymer film may be stretched in the dyebath, and the total stretch ratio added up together with the stretch ratios in the previous process may be from about 1.1 to about 3.5.

When iodine is used as the dichroic material, an iodide is preferably further added to the dyebath, because it can further improve the dyeing efficiency. Examples of the iodide include potassium iodide, lithium iodide, sodium iodide, zinc iodide, aluminum iodide, lead iodide, copper iodide, barium iodide, calcium iodide, tin iodide, and titanium iodide. The content of any of these iodides in the dyebath may be from about 0.010 to about 10% by weight. In particular, potassium iodide is preferably added, and the ratio (weight ratio) of iodine to potassium iodide is preferably in the range of 1:5 to 1:100. For the purpose of improving the in-plane uniformity of the film, a crosslinking agent such as a boron compound may be added as needed.

Besides the method of immersing in the dyebath described above, for example, the dyeing process may be a method of applying or spraying a dichroic material-containing aqueous solution onto the polymer film or a method of premixing a dichroic material in the process of forming the polymer film.

In the crosslinking step, for example, the polymer film is immersed in a treatment bath (a crosslinking bath) containing a crosslinking agent. Any known conventional material may be used as the crosslinking agent. Examples thereof include boron compounds such as boric acid and borax, glyoxal, and glutaraldehyde. One or more of these materials may be used alone or in any combination. When two or more are used in combination, for example, a combination of boric acid and borax is preferred, and the content ratio (molar ratio) of boric acid to borax is may be from about 4:6 to about 9:1. While water such as pure water is generally used as a solvent for the crosslinking bath, the crosslinking bath may also contain an organic solvent compatible with water. The concentration of the crosslinking agent in the crosslinking bath may be about 1 to about 10% by weight.

An iodide may be added to the crosslinking bath, because it can impart uniform in-plane properties to the polarizing film. Examples of the iodide include potassium iodide, lithium iodide, sodium iodide, zinc iodide, aluminum iodide, lead iodide, copper iodide, barium iodide, calcium iodide, tin iodide, and titanium iodide. The content of the iodide is preferably from 0.05 to 15% by weight, more preferably from 0.5 to 8% by weight. In particular, a combination of boric acid and potassium iodide is preferred, and the ratio (weight ratio) of boric acid to potassium iodide is preferably in the range of 1:0.1 to 1:3.5, more preferably in the range of 1:0.5 to 1:2.5. The temperature of the crosslinking bath is generally from 20 to 70° C., and the immersion time is generally from about 1 second to about 15 minutes. Similarly to the dyeing process, the crosslinking process may also use a method of applying or spraying a crosslinking agent-containing solution, or the crosslinking process may be performed simultaneously with the stretching process. In this case, the total stretch ratio may be from about 1.1 to about 3.5.

In the step of stretching by a wet stretching method, the film may be stretched to a total stretch ratio of about 2 to about 7 while immersed in a treatment bath (a stretching bath). A solution prepared by adding any of various metal salts and a compound of iodine, boron or zinc to a solvent such as water, ethanol or various organic solvents is preferably used as the solution for the stretching bath. In particular, a solution containing about 2 to about 18% by weight of each of boric acid and/or potassium iodide is preferably used. When boric acid and potassium iodide are used at the same time, the content ratio (weight ratio) of boric acid to potassium iodide is preferably from about 1:0.1 to about 1:4. The temperature of the stretching bath is preferably from about 40 to about 67° C.

In the step of washing with water, for example, the polymer film is immersed in a treatment bath (a water-washing bath) so that unnecessary residues, such as boric acid, deposited in the previous process can be washed out. An iodide may be added to the aqueous solution, and, for example, sodium iodide or potassium iodide is preferably used. The temperature of the water-washing bath may be from about 10 to about 60° C. The number of times of the water-washing process is not particularly limited. The water-washing process may be performed plural times, and it is preferred that the type and concentration of the additive in each water-washing bath be adjusted as needed.

When the polymer film is raised from each treatment bath, for the purpose of preventing dripping, a draining roll such as a known conventional pinch roll may be used, or excess water may be removed by a method of scraping off the liquid with an air knife, or the like.

The drying step may use any known conventional drying method such as natural drying, blow drying, and drying by heating. For example, in the drying by heating, the heating temperature may be from about 20 to about 80° C., and the drying time may be from about 1 to about 10 minutes. In the drying step, stretching may also be performed as needed.

With respect to the polarizing film prepared through the processes described above, the resulting stretch ratio (the total stretch ratio) is preferably from 3 to 7. If the total stretch ratio is less than 3.0, it can be difficult to obtain a polarizing film with a high degree of polarization. If the total stretch ratio exceeds 7, the film can easily be broken.

The method of producing the polarizing film is not limited to the above method, and any other method may be used to produce the polarizing film, as long as a moisture percentage of 10 to 60% by weight is satisfied. For example, the polarizing film may be produced by a dry stretching method or by kneading a polymer film material (such as polyethylene terephthalate (PET)) with a dichroic material, forming the mixture into a film and stretching the film. The polarizing film may also be an O-type film comprising a uniaxially oriented liquid crystal as a host to which a dichroic dye is added as a guest (U.S. Pat. No. 5,523,863 and JP-A No. 03-503322) or an E-type film using a dichroic lyotropic liquid crystal or the like (U.S. Pat. No. 6,049,428).

The transparent protective film is for the purpose of protecting the polarizing film and thus preferably has high transparency, mechanical strength, thermal stability, isotropy, and so on. The transparent protective film generally has a thickness of about 1 to about 300 μm, preferably of about 5 to about 100 μm. In terms of improving polarization properties, durability, adhesion properties, and so on, the surface of the transparent protective film may be subjected to surface modification treatment such as corona treatment, plasma treatment, flame treatment, ozone treatment, primer coating treatment, glow treatment, or saponification treatment. Among these surface modification treatments, saponification treatment with an alkali or the like is preferred. The water-vapor permeability of such a transparent protective film may be from about 0.5 to about 5000 g/m$^2$·24 h, when it is measured at a temperature of 40° C. and a relative humidity of 90% according to JIS Z 0208 (cup method).

As materials, that form the transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; acrylate type polymers; polyoxymethylene type polymers; epoxy type polymers; or blend polymers of the above-mentioned polymers may be mentioned. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

When the transparent protective film is bonded to both sides of the polarizing film, the transparent protective films having different properties may be used for the respective sides. Examples of such properties include thickness, material, light transmittance, tensile elasticity, and presence or absence of an optically functional layer.

At least one selected from a cellulose resin (polymer), a polycarbonate resin (polymer), a cyclic polyolefin resin (polyolefin having cyclo-type or norbornene structure), and a (meth)acrylic resin is preferably used for the transparent protective film according to the present invention. The effect of the present invention is especially remarkable when the triacetyl cellulose is used as the transparent protective film.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have an out-plane retardation (Rth) of about 60 nm or less, while having an in-plane retardation (Re) of almost zero.

Cellulose resin films with relatively small out-plane retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small out-plane retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and an out-plane retardation (Rth) of almost zero.

Any appropriate (meth)acrylic resin may be used as long as the advantages of the present invention are not reduced. Examples of such a (meth)acrylic resin include poly(meth) acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth) acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

[Formula 1]

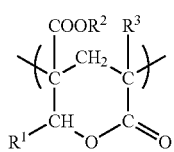

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and an out-plane retardation of less than 80 nm. The in-plane retardation Re is expressed by the formula Re=(nx−ny)×d, the out-plane retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having an out-plane retardation of from −90 nm to +75 nm may be preferably used. Thus, coloring (optical coloring) of polarizing plate resulting from a protective film may mostly be cancelled using a protective film having an out-plane retardation (Rth) of from −90 nm to +75 nm. The out-plane retardation (Rth) is preferably from −80 nm to +60 nm, and especially preferably from −70 nm to +45 nm.

Alternatively, the transparent protective film to be used may be a retardation plate having an in-plane retardation of 40 nm or more and/or an out-plane retardation of 80 nm or more. The in-plane retardation is generally controlled in the range of 40 to 200 nm, and the out-plane retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny>nz, nx>ny=nz, nx>nz>ny, nz=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has a in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has a in-plane retardation of 100 to 200 nm. For example, the retardation plate satisfying the relation nz=nx>ny (negative A plate) to be used preferably has a in-plane retardation of 100 to 200 nm. For example, the retardation plate satisfying the relation nx>nz>ny to be used preferably has a in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (uniaxial, biaxial, Z conversion, negative C-plate) is preferred. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (uniaxial, Z conversion, positive C-plate, positive A-plate) is preferred.

The film with a retardation may be separately prepared and laminated to a transparent protective film with no retardation so that the function described above can be provided.

The adhesive or pressure-sensitive adhesive layer for use in the lamination of the polarizing film and the transparent protective film may be of any type such as water-based type, solvent-based type, hot melt type, and radical-curable type, as long as it is optically transparent. In particular, a water-based adhesive or a radical-curable adhesive is preferred.

Examples of the water-based adhesive for forming the adhesive layer include, but are not limited to, vinyl polymer adhesives, gelatin adhesives, vinyl adhesives, latex adhesives, polyurethane adhesives, isocyanate adhesives, polyester adhesives, and epoxy adhesives. The adhesive layer may be formed from such a water-based adhesive by applying an aqueous solution of the adhesive and drying it. In the preparation of the aqueous solution, if necessary, a crosslinking agent or any other additive and a catalyst such as an acid may be added. A vinyl polymer-containing adhesive or the like is preferably used as the water-based adhesive, and the vinyl polymer is preferably a polyvinyl alcohol-based resin. The polyvinyl alcohol-based resin may also contain a water-soluble crosslinking agent such as boric acid or borax, glutaraldehyde or melamine, and oxalic acid. Particularly when a polyvinyl alcohol-based polymer film is used as the polarizing film, a polyvinyl alcohol-based resin-containing adhesive is preferably used in view of adhesion properties. An adhesive that contains an acetoacetyl group-containing polyvinyl alcohol-based resin is more preferred in terms of improving durability.

While the polyvinyl alcohol-based resin may be of any type, a polyvinyl alcohol-based resin with an average degree of polymerization of about 100 to about 3000 and an average degree of saponification of about 85 to about 100% by mole is preferably used in view of adhesion properties. The concentration of the aqueous adhesive solution is preferably, but not limited to, from 0.1 to 15% by weight, more preferably from 0.5 to 10% by weight, while it may be determined as appropriate depending on the desired thickness of the adhesive layer. If the concentration of the solution is too high, the viscosity can be too high so that stripe-like irregularities can be easily formed. If it is too low, the coatability can be poor so that unevenness can easily occur.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth) acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 2 to 7 mol %. If a degree of modification by an acetoacetyl group exceeds 40 mol %, reaction sites with a crosslinking agent is fewer to thereby reduce an effect of improvement on moisture resistance. The degree of modification by an acetoacetyl group is a value determined by NMR.

Any of crosslinking agents that have been generally used for the adhesives can be applied appropriate. When a polyvinyl alcohol-based adhesive is used as the adhesive, a crosslinking agent that can be preferably used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane) triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglicydyl ether, 1,6-hexanediol diglycidyl ether, trimethylolpropane triglycidyl ether, diglicidyl aniline and diglycidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals. In particular, amino-formaldehyde resins, especially methylol group-containing compounds are preferred.

The amount of the addition of the crosslinking agent is generally about 0.1 to about 35 parts by weight, preferably 10 to 25 parts by weight, based on 100 parts by weight of the resin. When importance is attached to the durability of the adhesive, the crosslinking agent may be effectively added in an amount of 30 to 46 parts by weight, more preferably of 32 to 40 parts by weight, in return for the fact that the time period from the preparation of the adhesive to the formation of the adhesive layer (pot life) is shortened.

Examples of the radical-curable adhesive include various types such as active energy ray-curable adhesives including electron beam-curable adhesives and ultraviolet-curable adhesives, and thermosetting adhesives. Among them, active energy ray-curable adhesives are preferred, and electron beam-curable adhesives are particularly preferred, because they are curable in a short time.

Examples of the curable component include (meth)acryloyl group-containing compounds and vinyl group-containing compounds. These curable components may be monofunctional or bi- or polyfunctional. One or more of these curable components may be used alone or in combination. Preferred examples of the curable component include (meth) acryloyl group-containing compounds and specifically include various epoxy (meth)acrylates, urethane (meth)acrylates, polyester (meth)acrylates, and various (meth)acrylate monomers.

Among the above curable components, epoxy (meth)acrylate is preferred, and monofunctional (meth)acrylate having an aromatic ring and a hydroxy group is particularly preferred. The term "(meth)acrylate" means acrylate and/or methacrylate. In the present invention, "(meth)acrylate" has the same meaning.

Various types of monofunctional (meth)acrylate having an aromatic ring and a hydroxy group may be used. In the present invention, the hydroxy group is preferably present in an organic group (preferably bonded to a hydrocarbon group, particularly to an alkylene group) that links the aromatic ring to (meth)acrylate, while the hydroxy group may be present as a substituent on the aromatic ring.

For example, the monofunctional (meth)acrylate having the aromatic ring and the hydroxy group may be a reaction product of an aromatic ring-containing monofunctional epoxy compound with (meth)acrylic acid. Examples of the aromatic ring-containing monofunctional epoxy compound include phenyl glycidyl ether, tert-butylphenyl glycidyl ether, and phenyl polyethylene glycol glycidyl ether. Examples of the monofunctional (meth)acrylate having the aromatic ring and the hydroxy group include 2-hydroxy-3-phenoxypropyl (meth)acrylate, 2-hydroxy-3-tert-butylphenoxypropyl (meth)acrylate, and 2-hydroxy-3-phenylpolyethyleneglycolpropyl (meth)acrylate.

A nitrogen-containing monomer and/or a carboxyl group-containing monomer is preferably used as the (meth)acryloyl group-containing compound. These monomers are preferred in view of adhesion properties.

Examples of the nitrogen-containing monomer include heterocyclic ring-containing acrylic monomers having a morpholine ring, a piperidine ring, a pyrrolidine ring, a piperazine ring, or the like, such as N-acryloylmorpholine, N-acryloylpiperidine, N-methacryloylpiperidine, and N-acryloylpyrrolidine. Examples of the nitrogen-containing monomer also include maleimide, N-cyclohexylmaleimide, N-phenylmaleimide; (N-substituted) amide monomers such as (meth) acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide, N-isopropylacrylamide, N-methylol(meth)acrylamide, N-hydroxyethyl(meth)acrylamide, and N-methylol-N-propane(meth)acrylamide; alkylaminoalkyl (meth)acrylate monomers such as aminoethyl (meth)acrylate, aminopropyl (meth)acrylate, N,N-dimethylaminoethyl (meth)acrylate, tert-butylaminoethyl (meth)acrylate, and 3-(3-pyrimidyl)propyl (meth)acrylate; and succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide. For example, the nitrogen-containing monomer is preferably a heterocyclic ring-containing acrylic monomer, particularly preferably N-acryloylmorpholine.

Examples of the carboxyl group-containing monomer include (meth)acrylic acid, carboxyethyl (meth)acrylate, and carboxypentyl (meth)acrylate. In particular, acrylic acid is preferred.

Other examples of the (meth)acryloyl group-containing compound include $C_1$ to $C_{12}$ alkyl (meth)acrylates such as methyl (meth)acrylate, ethyl (meth)acrylate, n-butyl (meth)acrylate, 2-ethylhexyl (meth)acrylate, isooctyl (meth)acrylate, isononyl (meth)acrylate, and lauryl (meth)acrylate; alkoxyalkyl (meth)acrylate monomers such as methoxyethyl (meth)acrylate and ethoxyethyl (meth)acrylate; hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate.

The monofunctional (meth)acrylate having the aromatic ring and the hydroxy group, the nitrogen-containing monomer, or the carboxyl group-containing monomer is preferably used as the curable component. These components preferably make up 50% by weight or more of the curable components, so that the resulting polarizing plate can include an adhesive layer with good adhesion to the polarizing film and the transparent protective film. Such content is also preferred in view of coatability, workability and so on. The content of these curable components is preferably 60% by weight or more, more preferably 70% by weight or more, still more preferably 80% by weight or more.

The curable component to be used may be a bi- or polyfunctional curable component. The bi- or polyfunctional curable component is preferably bi- or polyfunctional (meth)acrylate, particularly preferably bi- or polyfunctional epoxy (meth)acrylate. The bi- or polyfunctional epoxy (meth)acrylate may be obtained by the reaction of a polyfunctional epoxy compound with (meth)acrylic acid. Various types of polyfunctional epoxy compounds may be used. Examples of the polyfunctional epoxy compound include aromatic epoxy resins, alicyclic epoxy resins, and aliphatic epoxy resins.

Examples of aromatic epoxy resins include bisphenol epoxy resins such as diglycidyl ether of bisphenol A, diglycidyl ether of bisphenol F and diglycidyl ether of bisphenol S; novolac epoxy resins such as phenol novolac epoxy resins, cresol novolac epoxy resins, and hydroxybenzaldehyde phenol novolac epoxy resins; and polyfunctional epoxy reins such as glycidyl ether of tetrahydroxyphenylmethane, glycidyl ether of tetrahydroxybenzophenone, and epoxidized polyvinylphenol.

Examples of alicyclic epoxy resins include hydrogenated products of the aromatic epoxy resins and epoxy resins such as cyclohexane type, cyclohexyl methyl ester type, cyclohexyl methyl ether type, spiro type, or tricyclodecane type epoxy resins.

Examples of aliphatic epoxy resins include polyglycidyl ethers of aliphatic polyalcohols or alkylene oxide adducts thereof. Specific examples thereof include diglycidyl ether of 1,4-butanediol, diglycidyl ether of 1,6-hexanediol, triglycidyl ether of glycerin, triglycidyl ether of trimethylolpropane, diglycidyl ether of polyethylene glycol, diglycidyl ether of propylene glycol, and polyglycidyl ether of polyether polyol obtained by the addition of one or more alkylene oxides (such as ethylene oxide and propylene oxide) to aliphatic polyalcohols such as ethylene glycol, propylene glycol and glycerin.

The epoxy resin generally has an epoxy equivalent of 30 to 3000 g/equivalent, preferably of 50 to 1500 g/equivalent.

The bi- or polyfunctional epoxy (meth)acrylate is preferably epoxy (meth)acrylate of an aliphatic epoxy resin, particularly preferably epoxy (meth)acrylate of a bifunctional aliphatic epoxy resin.

Among the above curable components, the (meth)acryloyl group-containing compound, particularly the monofunctional (meth)acrylate having the aromatic ring and the hydroxy group, the nitrogen-containing (meth)acrylate, or the carboxyl group-containing (meth)acrylate is suitable for an electron beam-curable adhesive. If such an adhesive is used, a polarizing plate in which adhesion to the polarizing film and to the transparent protective film is good can be obtained. For example, even when a low moisture percentage polarizing film is used or even when a low water-vapor permeability material is used for the transparent protective film, the adhesive according to the present invention can have good adhesion to these materials so that it can form a polarizing plates with good dimensional stability.

While the curable adhesive contains the curable component, a radical initiator may be added to the adhesive, depending on the type of the curing, in addition to the component. When the adhesive to be used is of an electron beam-curable type, the addition of the radical initiator is not particularly required. When the ultraviolet-curable or thermosetting adhesive is used, the radical initiator should be used. The radical initiator is generally used in an amount of about 0.1 to about 10 parts by weight, preferably of 0.5 to 3 parts by weight, based on 100 parts by weight of the curable component.

The adhesive may also contain a metal compound filler. The metal compound filler can control the fluidity of the adhesive layer and stabilize the film thickness and thus can form a polarizing plate with a good appearance, in-plane uniformity and no unevenness in adhesion properties.

A variety of metal compound fillers may be used. Examples of the metal compound include metal oxides such as alumina, silica, zirconia, titania, aluminum silicate, calcium carbonate, and magnesium silicate; metal salts such as zinc carbonate, barium carbonate and calcium phosphate; and minerals such as celite, talc, clay, and kaolin. Surface-modified metal compound fillers may also be used.

The metal compound filler generally has an average particle size of about 1 to about 1000 nm, preferably of 1 to 500 nm, more preferably of 10 to 200 nm, still more preferably of 10 to 100 nm. If the average particle size of the metal compound filler is in the above range, the metal compound can be substantially uniformly dispersed in the adhesive layer so that the adhesion properties can be ensured and that a good appearance and adhesion properties with in-plane uniformity can be achieved.

The metal compound filler is preferably added in an amount of 100 parts by weight or less, based on 100 parts by weight of the adhesive component. If the amount of the addition of the metal compound filler is in the above range, a good appearance and adhesion properties with in-plane uniformity can be achieved while the adhesion between the polarizing film and the transparent protective film is ensured. The amount of the addition of the metal compound filler is preferably from 1 to 100 parts by weight, more preferably from 2 to 50 parts by weight, still more preferably from 5 to 30 parts by weight. Based on 100 parts by weight of the adhesive component, the addition of more than 100 parts by weight of the metal compound filler is not preferred in view of adhesion properties, because the content of the adhesive component in the adhesive becomes relatively low. While there is no limitation to the content of the metal compound filler, the lower limit of the above range is preferably adopted in order to achieve a good appearance and adhesion properties with in-plane uniformity.

In the formation of the adhesive or pressure-sensitive adhesive layer, a dry lamination method is preferably used, which allows solvent-free lamination or low solvent lamination. The dry lamination method may use any known dry lamination adhesive and any known lamination technique. This method may be used in combination with the essential feature of the present invention so that stripe-like irregularities can be more effectively reduced.

Examples of the dry lamination adhesive include two-part curable adhesives, two-part solvent-type adhesives, and one-part solvent-free adhesives. The two-part curable adhesives may be acrylic. The two-part solvent-type adhesives may be polyester-based, aromatic polyester-based, aliphatic polyester-based, polyester/polyurethane-based, polyether/polyurethane-based, or any other resin-based. The one-part solvent-free adhesives (moisture curing type) may be polyether/polyurethane-based or any other resin-based.

If necessary, the adhesive or pressure-sensitive adhesive layer may contain any appropriate additive. Examples of the additive include sensitizers for increasing the electron beam-curing rate or sensitivity, such as carbonyl compounds, coupling agents such as silane coupling agents and titanium coupling agents, adhesion promoters such as ethylene oxide, additives for improving wettability with the transparent protective film, additives for improving mechanical strength or workability, such as acryloxy group-containing compounds or hydrocarbons (natural or synthetic resins), ultraviolet-absorbing agents, age resistors, dyes, processing aids, ion-trapping agents, antioxidants, tackifiers, fillers (other than the metal compound fillers), plasticizers, leveling agents, antifoaming agents, antistatic agents, and stabilizers such as heat resistant stabilizers and hydrolysis resistant stabilizers.

The polarizing plate may be produced by bonding the transparent protective film to both sides of the polarizing film through the adhesive or pressure-sensitive adhesive layer interposed therebetween. In this process, an under coat layer, an adhesion facilitating layer or the like may be provided between the adhesive or pressure-sensitive adhesive layer and the transparent protective film or the polarizing film.

The adhesive layer formed from the water-based adhesive by the above production method preferably has a thickness of 30 to 300 nm, more preferably of 60 to 250 nm. On the other hand, the adhesive layer formed from the curable adhesive preferably has a thickness of 0.1 to 200 $\mu$m, more preferably of 0.5 to 50 $\mu$m, still more preferably of 0.5 to 10 $\mu$m.

The polarizing plate and at least one of a variety of optically functional layers may be laminated to form a laminate for use as an optical film. Examples of the optically functional layer include a surface treatment layer such as a hard coating layer, an antireflection layer, a sticking prevention layer, a diffusing layer, or an antiglare layer, and an oriented liquid crystal layer for viewing angle compensation, optical compensation or the like. Examples thereof also include a single layer or a laminate of two or more layers of an optical film or films for use in forming image displays and the like, such as a polarization converter, a reflecting plate, a semitransparent plate, a retardation plate (including a wave plate (A plate) such as a half-wave plate and a quarter-wave plate), a viewing angle compensation film, and a brightness enhancement film. Particularly preferably used is a reflective or transflective polarizing plate comprising a laminate of the polarizing plate and a reflecting plate or a transflector, an elliptically or circularly polarizing plate comprising a laminate of the polarizing plate and a retardation plate, a wide viewing angle polarizing plate comprising a laminate of the polarizing plate and a viewing angle compensation layer or film, or a polarizing plate comprising a laminate of the polarizing plate and a brightness enhancement film.

When the optically functional layer is laminated, the surface treatment layer or the oriented liquid crystal layer may be generally laminated directly on a film such as the polarizing plate. However, optically functional layers of various films are preferably laminated through an adhesive or pressure-sensitive adhesive layer interposed therebetween. In this case, a pressure-sensitive adhesive layer composed of a pressure-sensitive adhesive is particularly preferably used, among adhesive and pressure-sensitive adhesive layers.

The pressure-sensitive adhesive layer may be formed using any appropriate conventional pressure-sensitive adhesive such as an acrylic, silicone, polyester, polyurethane, polyether, or rubber pressure-sensitive adhesive. The pressure-sensitive adhesive preferably form a pressure-sensitive adhesive layer with low coefficient of moisture absorption and high heat resistance, in view of prevention of a foaming or peeling phenomenon due to moisture absorption, prevention of a reduction in optical properties due to a thermal expansion difference or the like, prevention of warpage of a liquid crystal cell, and the capability to form an image display with high quality and high durability. In view of prevention of a change in the optical properties of the polarizing plate and the like, it is preferred to use a pressure-sensitive adhesive that does not require a high temperature process for curing or drying or does not require a long time for curing or drying. From these points of view, acrylic pressure-sensitive adhesives are preferably used for the polarizing plate or the optical film. File particles may also be added to the pressure-sensitive adhesive, so that the resulting pressure-sensitive adhesive layer can exhibit light diffusion properties.

The adhesive or pressure-sensitive adhesive layer may be provided on a necessary surface as needed. For example, concerning the polarizing plate composed of the polarizing film and the protective film as provided in the present invention, the adhesive or pressure-sensitive adhesive layer may be formed on one or both sides of the polarizing plate as needed, namely, it may be formed on the other surface of the protective film, which is opposite to the side bonded to the polarizing film. The post-drying thickness of the adhesive or pressure-sensitive adhesive layer composed of the pressure-sensitive adhesive for use in the lamination of the optically functional layer is generally, but not limited to, from about 1 to about 500 µm, preferably from 5 to 200 µm, more preferably from 10 to 100 µm. If the adhesive or pressure-sensitive adhesive layer has a thickness in the above range, the stress associated with the dimensional behavior of the polarizing plate or the optically functional layer can be relaxed.

When the pressure-sensitive adhesive layer is exposed on the surface, it is preferred that the pressure-sensitive adhesive layer should be transiently covered with a separator for the purpose of antifouling or the like, until practical use. The separator preferably comprises an appropriate film, like the protective film described above, and optionally a release coating that is formed on the film and made of an appropriate release agent such as a silicone, long-chain alkyl, fluoro- or molybdenum sulfide release agent.

A hard coating processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an antiglare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface. An antiglare layer may serve as a diffusion layer (viewing angle expanding function etc.) for diffusing transmitting light through the polarizing plate and expanding a viewing angle etc.

In addition, the above-mentioned optically functional layer such as antireflection layer, sticking prevention layer, diffusion layer, antiglare layer, or the like may be directly prepared on the polarizing plate, and also they may be prepared as an other film different from the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a protective film etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate.

The elliptically polarizing plate or circularly polarizing plate in which the retardation plate is laminated to the polarizing plate is described following paragraph. The retardation plates are applied to change linearly polarized light into elliptically polarized light or circularly polarized light, elliptically polarized light or circularly polarized light into linearly polarized light or change the polarization direction of linearly polarization. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringence films formed by uniaxially or biaxially stretching polymer films; aligned films in which aligned liquid crystal monomer is crosslinked and polymerized; aligned films comprising liquid crystal polymer; and films on which an alignment layer of a liquid crystal material is supported may be mentioned.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

A viewing angle compensation film is a film for extending viewing angle so that a picture may look comparatively clearly, even when it is viewed from an oblique direction not from vertical direction to a screen. The viewing angle compensation film is suitably combined for the purpose of prevention of coloring caused by change of visible angle based on retardation by liquid crystal cell etc. and of expansion of viewing angle with good visibility. Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

Examples of the polarization converter include an anisotropic reflective polarizer and an anisotropic scattering polarizer and specifically include PCF series manufactured by Nitto Denko Corporation and DBEF series manufactured by 3M. A reflective grid polarizer is also preferably used as the anisotropic reflective polarizer. Examples thereof include Micro Wires manufactured by Moxtek Incorporated. For example, the anisotropic scattering polarizer may be DRPF manufactured by 3M or the like.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved.

Moreover, the polarizing plate of the present invention may consist of multi-layered film of laminated layers of a polarizing plate and two of more of optically functional layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

Although an optical film with the above described optically functional layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optically functional layers, the optical axis may be set as a suitable configuration angle according to the target retardation characteristics etc.

In addition, ultraviolet absorbing property may be given to the above-mentioned each layer, such as the polarizing plate, the optically functional layers, the adhesive layer and the pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

The polarizing plate according to the present invention is preferably used to form an image display such as a liquid crystal display (LCD) and an electroluminescence display (ELD).

The polarizing plate is preferably used to form a liquid crystal display or the like. For example, the polarizing plate may be used for liquid crystal displays, such as reflective, transflective or hybrid transmissive/reflective liquid crystal displays, which comprise a liquid crystal cell and the polarizing plate placed on one side or both sides of the liquid crystal cell. The liquid crystal cell substrate may be any of a plastic substrate and a glass substrate. The liquid crystal display may use any appropriate type of liquid crystal cell such as an active matrix driving type such as a thin-film transistor type; and a simple matrix driving type such as a twisted nematic type and a super twisted nematic type.

If the polarizing plates or the optical films are placed on both sides of the liquid crystal cell, they may be the same or different. Additionally, any other appropriate components such as a prism array sheet, a lens array sheet, a light diffusion plate, and a backlight may also be placed in one or more layers at appropriate positions to form the liquid crystal display.

EXAMPLES

The present invention is more specifically described using the examples and the comparative examples below, which are not intended to limit the scope of the present invention.

(Method for Measuring Moisture Percentage of Polarizing Film)

A 180 mm×500 mm sample was cut from the resulting polarizing film and its initial weight (W (g)) was measured. The sample was allowed to stand in a drying machine at 120° C. for 2 hours and then measured for post-drying weight (D (g)). These measured values were used to calculate a moisture percentage according to the following formula: moisture percentage (%)={(W−D)/W}×100

(Preparation of Polarizing Film)

A 75 μm-thick polyvinyl alcohol film (VF-PS7500, manufactured by Kuraray Co., Ltd., 1000 mm in width) was stretched to a stretch ratio of 2.5 while immersed in pure water at 30° C. for 60 seconds, then dyed in an aqueous iodine solution (pure water/iodine (I)/potassium iodide (KI)=100/0.01/1 in weight ratio) at 30° C. for 45 seconds, then stretched to a stretch ratio of 5.8 in an aqueous 4% by weight boric acid solution and immersed in pure water for 10 seconds, and then dried at 40° C. for 3 minutes while the tension of the film was maintained, so that a polarizing film was obtained. The polarizing film had a thickness of 25 μm and a moisture percentage of 30% by weight.

(Preparation of Adhesive Layer-Attached Transparent Protective Film)

A hundred parts by weight of PVA resin (Gosenol, manufactured by Nippon Synthetic Chemical Industry Co., Ltd.) and 35 parts by weight of a crosslinking agent (Watersol, manufactured by Dainippon Ink and Chemicals, Incorporated) were dissolved in 3760 parts by weight of pure water to obtain an adhesive. The adhesive was applied to one side of an 80 μm-thick triacetyl cellulose (TAC) film (UZ-80T, manufactured by Fujifilm Corporation, 1.4% by weight in moisture percentage) with a slot die and then dried at 85° C. for 1 minute so that an adhesive layer-attached TAC film having a 0.1 μm-thick adhesive layer was obtained.

Example 1

Preparation of Polarizing Plate

A polarizing plate was prepared using the method shown in FIG. 1. The polarizing film was used as the resin film A, and the adhesive layer-attached TAC film was used as each of the first and second transparent films B1 and B2. The feeding of the adhesive layer-attached TAC film was performed in such a manner that the TAC film side was placed on the first metal roll b1 side and on the second metal roll b2 side. An iron roll with a diameter of 200 mm was used as each of the first metal roll b1 and the second metal roll b2. A roll with a diameter of 200 mm composed of an iron core and a rubber layer (with a hardness of 90 degrees and a thickness of 3 mm) provided around the iron core was used as each of the first elastic roll a1 and the second elastic roll a2.

The polarizing film and the adhesive layer-attached TAC film were fed between the first elastic roll and the first metal roll and bonded to each other under pressure so that a laminated film (corresponding to the laminated film L1 in FIG. 1) was obtained in which the TAC film was bonded to one side of the polarizing film. In this process, the lamination pressure between the first elastic roll and the first metal roll was 3.5 MPa, and the first elastic roll was inwardly deformed by pressing against the first metal roll. The endpoint (x1) of the dented (inwardly deformed) portion as shown in FIG. 2A was determined. The feeding of the polarizing film was performed in such a manner the line of feeding of the polarizing film made an angle (θ1a) of −11.1° with the tangent line (y1) at the endpoint of the inwardly deformed portion of the first elastic roll. On the other hand, the feeding of the first transparent film was performed in such a manner that the line of feeding of the first transparent film made an angle (θ1b) of +94° with the tangent line (y1) at the endpoint (x1) of the dented portion. Concerning the angles, the clockwise angle from the tangent line (y1) is "+" (positive), while the counterclockwise angle from the tangent line (y1) is "−" (negative).

The laminated film was then used without being wound up. The laminated film and the adhesive layer-attached TAC film were fed between the second elastic roll and the second metal roll and bonded to each other under pressure so that a polarizing plate (corresponding to the multilayer laminated film L2 in FIG. 1) was obtained that comprised the polarizing film and the TAC films bonded to both sides of the polarizing film. In this process, the lamination pressure between the second elastic roll and the second metal roll was 3.5 MPa, and the second elastic roll was inwardly deformed by pressing against the second metal roll. The endpoint (x2) of the dented (inwardly deformed) portion as shown in FIG. 2B was determined. The feeding of the laminated film was performed in such a manner the line of feeding of the laminated film made an angle (θ2a) of +11.1° with the tangent line (y2) at the endpoint of the inwardly deformed portion of the second elastic roll. On the other hand, the feeding of the second transparent film was performed in such a manner that the line of feeding of the second transparent film made an angle (θ2b) of −94° with the tangent line (y2) at the endpoint (x2) of the dented portion. Concerning the angles, the clockwise angle from the tangent line (y2) is "+" (positive), while the counterclockwise angle from the tangent line (y2) is "−" (negative).

In the process, the feed speed of each film was 30 m/minute. The resulting polarizing plate was dried at 80° C. for 2 minutes after the lamination.

Examples 2 to 18

Polarizing plates were obtained using the process of Example 1, except that the angle (θ1a) or (θ1b) made by the line of feeding of each film with the tangent line (y1), the angle (θ2a) or (θ2b) made by the line of feeding of each film with the tangent line (y2), or the lamination pressure was changed as shown in Table 1.

Example 19

A polarizing plate was obtained using the process of Example 16, except that the rubber layer of each of the first elastic roll and the second elastic roll was replaced by a rubber layer with a hardness of 65 degrees.

Example 20

A polarizing plate was obtained using the process of Example 16, except that the rubber layer of each of the first elastic roll and the second elastic roll was replaced by a rubber layer with a hardness of 75 degrees.

Comparative Examples 1 to 9

Polarizing plates were obtained using the process of Example 1, except that the methods shown in FIGS. 3 to 6 were used in place of the method shown in FIG. 1 so that the relationship between each roll and each film was changed and except that the angle (θ1a) or (θ1b) made by the line of feeding of each film with the tangent line (y1), the angle (θ2a) or (θ2b) made by the line of feeding of each film with the tangent line (y2), or the lamination pressure was changed as shown in Table 1.

The polarizing plates prepared in the examples and the comparative examples were evaluated as described below. The results are shown in Table 1.

(Determination of Bubbles)

A 500 mm×300 mm sample was cut from each resulting polarizing plate, and then the number of bubbles between the polarizing film and the TAC film was determined.

TABLE 1

| | Reference Drawing | First Rolls Roll Type PVA Side | First Rolls Roll Type TAC Side | Lamination Pressure (MPa) | Entering Angle PVA (θ1a) | Entering Angle TAC (θ1b) | Second Rolls Roll Type Laminated Film Side | Second Rolls Roll Type TAC Side | Lamination Pressure (MPa) | Entering Angle Laminated Film (θ2a) | Entering Angle TAC (θ2b) | Number of Bubbles (counts) |
|---|---|---|---|---|---|---|---|---|---|---|---|---|
| Example 1 | FIG. 1 | Rubber | Iron | 3.5 | −11.1 | +94.0 | Rubber | Iron | 3.5 | +11.1 | −94.0 | 5 |
| Example 2 | FIG. 1 | Rubber | Iron | 3.5 | −9.7 | +94.0 | Rubber | Iron | 3.5 | +9.7 | −94.0 | 1 |
| Example 3 | FIG. 1 | Rubber | Iron | 3.5 | −8.3 | +94.0 | Rubber | Iron | 3.5 | +8.3 | −94.0 | 0 |
| Example 4 | FIG. 1 | Rubber | Iron | 3.5 | −6.9 | +94.0 | Rubber | Iron | 3.5 | +6.9 | −94.0 | 2 |
| Example 5 | FIG. 1 | Rubber | Iron | 3.5 | −5.4 | +94.0 | Rubber | Iron | 3.5 | +5.4 | −94.0 | 3 |
| Example 6 | FIG. 1 | Rubber | Iron | 3.5 | −2.6 | +94.0 | Rubber | Iron | 3.5 | +2.6 | −94.0 | 7 |
| Example 7 | FIG. 1 | Rubber | Iron | 3.5 | −1.1 | +94.0 | Rubber | Iron | 3.5 | +1.1 | −94.0 | 3 |
| Example 8 | FIG. 1 | Rubber | Iron | 3.5 | +0.3 | +94.0 | Rubber | Iron | 3.5 | −0.3 | −94.0 | 13 |
| Example 9 | FIG. 1 | Rubber | Iron | 3.5 | +1.7 | +94.0 | Rubber | Iron | 3.5 | −1.7 | −94.0 | 28 |
| Example 10 | FIG. 1 | Rubber | Iron | 3.5 | +3.1 | +94.0 | Rubber | Iron | 3.5 | −3.1 | −94.0 | 37 |
| Example 11 | FIG. 1 | Rubber | Iron | 3.5 | +4.5 | +94.0 | Rubber | Iron | 3.5 | −4.5 | −94.0 | 150 |
| Example 12 | FIG. 1 | Rubber | Iron | 3.5 | +5.9 | +94.0 | Rubber | Iron | 3.5 | −5.9 | −94.0 | 150 |
| Example 13 | FIG. 1 | Rubber | Iron | 3.5 | +7.3 | +94.0 | Rubber | Iron | 3.5 | −7.3 | −94.0 | 200 |
| Example 14 | FIG. 1 | Rubber | Iron | 3.5 | +8.7 | +94.0 | Rubber | Iron | 3.5 | −8.7 | −94.0 | 100 |
| Example 15 | FIG. 1 | Rubber | Iron | 3.5 | +10.0 | +94.0 | Rubber | Iron | 3.5 | −10.0 | −94.0 | 150 |
| Example 16 | FIG. 1 | Rubber | Iron | 2.0 | −8.3 | +94.0 | Rubber | Iron | 2.0 | +8.3 | −94.0 | 111 |
| Example 17 | FIG. 1 | Rubber | Iron | 4.0 | −8.3 | +94.0 | Rubber | Iron | 4.0 | +8.3 | −94.0 | 3 |
| Example 18 | FIG. 1 | Rubber | Iron | 4.1 | −8.3 | +94.0 | Rubber | Iron | 4.1 | +8.3 | −94.0 | 2 |
| Example 19 | FIG. 1 | Rubber | Iron | 2.0 | −8.3 | +94.0 | Rubber | Iron | 2.0 | +8.3 | −94.0 | 219 |
| Example 20 | FIG. 1 | Rubber | Iron | 2.0 | −8.3 | +94.0 | Rubber | Iron | 2.0 | +8.3 | −94.0 | 150 |
| Comparative example 1 | FIG. 3 | Rubber | Rubber | 1.0 | −8.3 | +94.0 | Rubber | Rubber | 1.0 | +8.3 | −94.0 | 2470 |
| Comparative example 2 | FIG. 3 | Rubber | Rubber | 1.4 | −8.3 | +94.0 | Rubber | Rubber | 1.4 | +8.3 | −94.0 | 2400 |
| Comparative example 3 | FIG. 3 | Rubber | Rubber | 1.8 | −8.3 | +94.0 | Rubber | Rubber | 1.8 | +8.3 | −94.0 | 2300 |
| Comparative example 4 | FIG. 4 | Rubber | Iron | 2.0 | — | — | — | — | — | — | — | 1560 |
| Comparative example 5 | FIG. 4 | Rubber | Iron | 3.2 | — | — | — | — | — | — | — | 810 |
| Comparative example 6 | FIG. 4 | Rubber | Iron | 3.5 | — | — | — | — | — | — | — | 912 |
| Comparative example 7 | FIG. 4 | Rubber | Iron | 4.0 | — | — | — | — | — | — | — | 549 |
| Comparative example 8 | FIG. 5 | Iron | Rubber | 3.5 | −8.3 | +94.0 | Iron | Rubber | 3.5 | +8.3 | −94.0 | *1 |
| Comparative example 9 | FIG. 6 | Iron | Iron | 3.5 | −8.3 | +94.0 | Iron | Iron | 3.5 | +8.3 | −94.0 | *2 |

In Table 1, Mark *1 indicates that bubble were trapped between the polarizing film and the first metal roll and transported so that the resulting polarizing plate had marks of irregularities formed by bubbles, and Mark *2 indicates that precise control of the line pressure was not possible so that a polarizing plate with wrinkles was formed.

As is apparent from the results in Table 1, in each example according to the present invention, bubble are prevented from being formed between the resin film (polarizing film) and the transparent film (transparent protective film), and the multilayer laminated film is successfully produced. A comparison between Examples 1 to 7 and Examples 8 to 15 shows that bubbles can be further suppressed by controlling the angle (θ1a) or (θ1b) made by the line of feeding of each film with the tangent line (y1) or by controlling the angle (θ2a) or (θ2b) made by the line of feeding of each film with the tangent line (y2).

What is claimed is:

1. A method for producing a multilayer laminated film comprising:
    laminating a resin film having a moisture percentage of 10% by weight to 60% by weight with a first transparent film and a second transparent film each having a moisture percentage of 0.5% by weight to 5% by weight to be bonded to both sides of the resin film through an adhesive or pressure-sensitive adhesive layer interposed therebetween; wherein the laminating comprising steps of:
    passing the resin film and the first transparent film between a pair of a first metal roll and a first elastic roll in such a manner that the first transparent film is placed on the first metal roll side so that they are bonded to each other under pressure to form a laminated film; and then,
    using the laminated film without winding up it and passing the laminated film and the second transparent film between a pair of a second metal roll and a second elastic roll in such a manner that the second transparent film is placed on the second metal roll side so that they are bonded to each other under pressure to form a multilayer laminated film,
    wherein an angle (θ1a) made by a line of feeding of the resin film with a tangent line at an endpoint of an inwardly deformed portion of the first elastic roll and an angle (θ1b) made by a line of feeding of the first transparent film with the tangent line at the endpoint of the inwardly deformed portion of the first elastic roll are opposite in direction to each other with respect to the tangent line at the endpoint of the inwardly deformed portion of the first elastic roll, where the endpoint of the inwardly deformed portion of the first elastic roll corresponds to the first contact point between the first elastic roll and the first metal roll in the inwardly deformed portion of the first elastic roll, which is formed when the first elastic roll is brought into contact with and pressed against the first metal roll, the line of feeding of the resin film corresponds to a tangent line at the first contact point between the resin film and the first elastic roll, and the line of feeding of the first transparent film corresponds to a tangent line at the first contact point between the first transparent film and the first metal roll.

2. The method according to claim 1, further comprising using means that changes the angle ($\theta 1a$) made by the line of feeding of the resin film with the tangent line at the endpoint of the inwardly deformed portion of the first elastic roll before the resin film is fed between the pair of the first metal roll and the first elastic roll.

3. A method for producing a multilayer laminated film comprising:

laminating a resin film having a moisture percentage of 10% by weight to 60% by weight with a first transparent film and a second transparent film each having a moisture percentage of 0.5% by weight to 5% by weight to be bonded to both sides of the resin film through an adhesive or pressure-sensitive adhesive layer interposed therebetween; wherein the laminating comprising steps of:

passing the resin film and the first transparent film between a pair of a first metal roll and a first elastic roll in such a manner that the first transparent film is placed on the first metal roll side so that they are bonded to each other under pressure to form a laminated film; and then, using the laminated film without winding up it and passing the laminated film and the second transparent film between a pair of a second metal roll and a second elastic roll in such a manner that the second transparent film is placed on the second metal roll side so that they are bonded to each other under pressure to form a multilayer laminated film, wherein an angle ($\theta 2a$) made by a line of feeding of the laminated film with a tangent line at an endpoint of an inwardly deformed portion of the second elastic roll and an angle ($\theta 2b$) made by a line of feeding of the second transparent film with the tangent line at the endpoint of the inwardly deformed portion of the second elastic roll are opposite in direction to each other with respect to the tangent line at the endpoint of the inwardly deformed portion of the second elastic roll, where the endpoint of the inwardly deformed portion of the second elastic roll corresponds to the first contact point between the second elastic roll and the second metal roll in the inwardly deformed portion of the second elastic roll, which is formed when the second elastic roll is brought into contact with and pressed against the second metal roll, the line of feeding of the laminated film corresponds to a tangent line at the first contact point between the laminated film and the second elastic roll, and the line of feeding of the second transparent film corresponds to a tangent line at the first contact point between the second transparent film and the second metal roll.

4. The method according to claim 3, further comprising using means that changes the angle ($\theta 2a$) made by the line of feeding of the laminated film with the tangent line at the endpoint of the inwardly deformed portion of the second elastic roll before the laminated film is fed between the pair of the second metal roll and the second elastic roll.

* * * * *